Figures 1, 2:
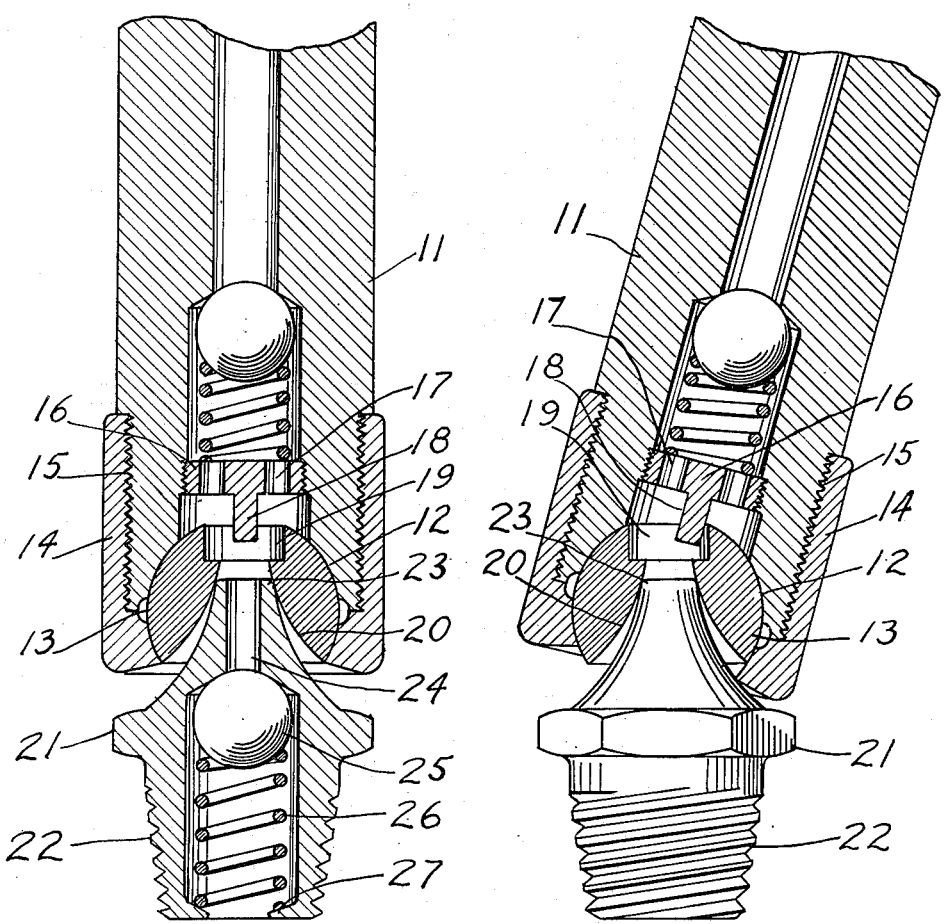

Nov. 19, 1929.   S. M. JONSSON   1,736,160
LUBRICATING DEVICE
Filed Jan. 2, 1929

INVENTOR
Sven M. Jonsson

Patented Nov. 19, 1929

1,736,160

UNITED STATES PATENT OFFICE

SVEN M. JONSSON, OF WOODSIDE, NEW YORK, ASSIGNOR TO AUTOMOTIVE ROYALTIES CORPORATION, INC., OF NEW YORK, N. Y., A CORPORATION OF DELAWARE

LUBRICATING DEVICE

Application filed January 2, 1929. Serial No. 329,850.

This invention relates to lubricating devices with particular reference to means for forcing grease into bearings by pressure. The objects of this invention are to provide a nipple of simple construction adapted to be fitted to a bearing, and a coupling of a type adapted to be held in grease tight connection by a relatively light pressure against said nipple.

One of the defects in similar types of couplings at present in use, is that at high hydrostatic pressures the coupling tends to separate from the nipple, thus permitting leakage of grease and limiting the hydrostatic pressure obtainable.

The present invention reduces this trouble by providing a coupling in which the areas, which tend to separate the coupling from the nipple under pressure, are relatively small, and the separating force between the coupling and the nipple thereby reduced, which permits high hydrostatic pressures when forcing grease into bearings.

Other advantages will be pointed out in the specification and illustrated in the accompanying drawing in which—

Figure 1 is a central longitudinal section of a coupling and a nipple. Fig. 2 is a central longitudinal section of a coupling in an angular position relatively to the nipple and with the nipple shown in elevation.

Referring to Fig. 1, a grease conveying tube, part of which is shown at 11, is adapted to convey grease from a pump or gun. The tube 11 has a spherical seat 12 at its outer end to receive a ball 13, said ball being retained on the seat by the cap 14 which may be screwed to the tube 11 by the threaded portion 15.

It will be seen by referring to Fig. 2 that the ball 13 is free to turn in its seat to a limit imposed by the stop 16 which comprises a disc threaded at its periphery and screwed into the end of the tube 11, said disc having openings 17 and a central pin 18 which projects into an opening 19 in the ball 13. In the outer face of the ball 13 is a conical opening 20 adapted to receive the end of the nipple 21.

The nipple 21 comprises a body having a threaded portion 22 by which said nipple may be screwed into a bearing or part to be lubricated. The outer part of said nipple is conical and terminates in an annular surface 23 the periphery of said surface being adapted to fit within the opening 20 of the ball 13. An opening 24 in said nipple is closed by a ball 25 to keep foreign matter from the inner part of the nipple. The ball 25 being seated by a spring 26 and said spring is retained in position by the projections 27 within said opening.

In action the coupling is placed upon the nipple and held in contact therewith, while grease is forced through the tube 11 and through the nipple. It will be seen that the ball 13, by being free to turn, will adjust itself to bring the opening 20 into axial alignment with the nipple. This self aligning action of the ball permits the coupling to be placed on the nipple in anyone of a plurality of angles while yet retaining grease-tight connection. It will be further seen that the annular end or surface 23 of the nipple, may be made of small diameter, thus offering but small surface to be acted upon by hydrostatic pressure and permitting the coupling to be held in contact with the nipple with little effort.

The preferred form shown may be changed without departing from the spirit of the invention as shown in the following claims.

I claim:

1. In a device of the character described, in combination, a lubricant conveying tube having a spherical seat in the end thereof, a spherical member adapted to oscillate in said seat, a cap adapted to hold the spherical member on said seat, said spherical member having a tapered hole therethrough, and a lubricant receiving member having an end adapted to fit into said tapered hole for the purpose of forming a lubricant tight connection therewith.

2. In a device of the character described, in combination, a lubricant conveying tube, an oscillatory member movably mounted in the end of said tube, said oscillatory member having a tapered hole therethrough, and a lubricant receiving nipple having an end adapted to fit within said tapered hole for the purpose of forming a lubricant tight connection therewith.

3. In a device of the character described, in combination, a lubricant conveying body, an oscillatory member movably carried by said body and having a tapered hole therein, said body having an opening therethrough, and communicating with the hole in said oscillatory member, and a lubricant receiving member having an end adapted to fit within said tapered hole for the purpose of forming a lubricant sealing connection therewith.

4. In a device of the character described, in combination, a lubricant conveying tube, an oscillatory member movably mounted in the end of said tube, said oscillatory member having a tapered hole therethrough, a stop pin adapted to limit the angle of movement of said oscillatory member, and a lubricant receiving member having an end adapted to fit within said tapered hole for the purpose of forming a lubricant sealing connection therewith.

SVEN M. JONSSON.